Figure 1:
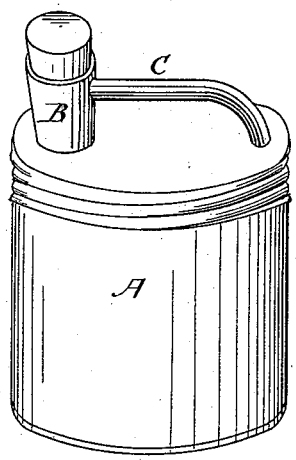

(No Model.)

J. M. STIMPSON.
LIQUID CONTAINING PACKAGE.

No. 308,106. Patented Nov. 18, 1884.

WITNESSES
J. Henry Taylor.
James F. Bligh.

INVENTOR
John M. Stimpson

UNITED STATES PATENT OFFICE.

JOHN M. STIMPSON, OF BOSTON, MASSACHUSETTS.

LIQUID-CONTAINING PACKAGE.

SPECIFICATION forming part of Letters Patent No. 308,106, dated November 18, 1884.

Application filed April 12, 1884. (No model.)

*To all whom it may concern:*

Be it known that I, JOHN M. STIMPSON, of Boston, county of Suffolk, and State of Massachusetts, a citizen of the United States, have invented certain new and useful Improvements in Liquid-Containing Packages, of which the following is a specification.

My present invention relates to liquid-containing vessels provided with a nozzle and an air-tube; and it consists in an improvement in the arrangement of these parts.

In the annexed drawing I have represented my present improvement as applied to a metal can of ordinary construction.

In the drawing, A represents the body of the can; B, the nozzle or outpouring passage; and C, the hollow air-conducting handle, which communicates with the interior of the can and also with the interior of the nozzle below its rim. The same stopper which closes the nozzle also cuts off communication with the air-tube from without, and the tube C is so constructed that it serves at the same time as an air-tube and as a handle for lifting and pouring out.

I prefer to attach the nozzle and the conducting-handle to the cover of the can, and to make this detachable, as shown.

Figure 2:
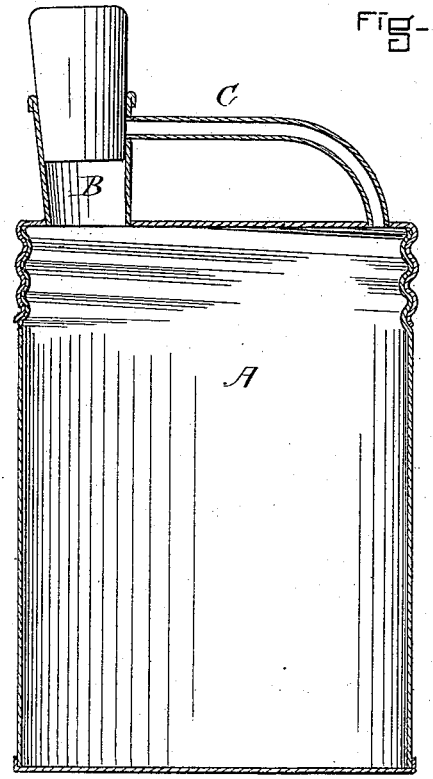
Figure 3:
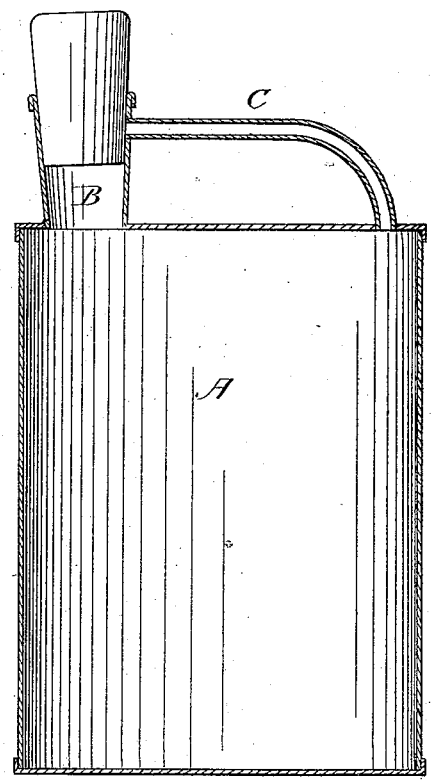

Making the cover removable gives ample access to the can for cleaning and filling it. The cover, nozzle, and air-conducting handle being united so as to form a single part, as shown in Figs. 1 and 2, forms a convenient and useful feature. The cap or cover may, however, be fixedly attached to the can, as shown in Fig. 3.

I claim—

1. As a new article of manufacture, the improved vessel herein described, provided with the nozzle B and the air-conducting handle C.

2. The combination of the nozzle B, air-conducting handle C, and detachable cover D, substantially as and for the purposes herein set forth.

In testimony whereof I have hereunto subscribed my name this 5th day of April, A. D. 1884.

JOHN M. STIMPSON.

Witnesses:
J. HENRY TAYLOR,
JAMES F. BLIGH.